(12) United States Patent
Hoffjann et al.

(10) Patent No.: US 7,036,314 B2
(45) Date of Patent: May 2, 2006

(54) METHOD FOR TREATING AND DISTRIBUTING WATER GENERATED IN A SELF-CONTAINED WATER USING UNIT

(75) Inventors: Claus Hoffjann, Hamburg (DE); Hans-Juergen Heinrich, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 93 days.

(21) Appl. No.: 10/417,894

(22) Filed: Apr. 16, 2003

(65) Prior Publication Data

US 2004/0038089 A1 Feb. 26, 2004

(30) Foreign Application Priority Data

Apr. 16, 2002 (DE) ................. 102 16 709

(51) Int. Cl.
*B64D 11/00* (2006.01)
*C02F 1/16* (2006.01)
*C02F 9/00* (2006.01)
*H01M 8/00* (2006.01)

(52) U.S. Cl. ............................ 60/645; 60/648; 60/655; 60/670; 429/13; 429/17; 429/26

(58) Field of Classification Search ................ 60/645, 60/648, 654, 643, 644.1, 646, 647, 649–653, 60/655–684; 429/12, 13, 26, 14–25, 27–46
See application file for complete search history.

(56) References Cited

U.S. PATENT DOCUMENTS

| | | | | | |
|---|---|---|---|---|---|
| 4,871,452 | A | * | 10/1989 | Kohler et al. | 210/258 |
| 5,005,787 | A | * | 4/1991 | Cullingford | 210/748 |
| 6,143,185 | A | * | 11/2000 | Tracy et al. | 210/258 |
| 6,296,957 | B1 | * | 10/2001 | Graage | 429/12 |
| 6,316,134 | B1 | * | 11/2001 | Cownden et al. | 429/12 |
| 6,916,564 | B1 | * | 7/2005 | Clawson et al. | 429/17 |
| 6,921,595 | B1 | * | 7/2005 | Clawson et al. | 429/17 |
| 2004/0038089 | A1 | * | 2/2004 | Hoffjann et al. | 429/12 |

* cited by examiner

*Primary Examiner*—Sheldon J Richter
(74) *Attorney, Agent, or Firm*—W. F. Fasse; W. G. Fasse

(57) ABSTRACT

Water for use in a self-contained water using unit, such as an aircraft, watercraft, ground conveyance, or stationary unit, is treated so that water of different qualities can be distributed to different use locations in the self-contained unit. The treatment is performed by a process using a combined high temperature fuel cell (1) operating at temperatures above 500° C. and a turbine (6) with a reformer process (2) integrated into the fuel cell. The reformer process is operated by the heat of the fuel cell which uses a hydrocarbon fuel to which contaminated and/or fresh water is admixed. The heat of the fuel cell is used for a water purification process. Purified water is filtered in an active charcoal filter and distributed by a distribution system. At least a portion of the purified water available for distribution is automatically salified.

33 Claims, 1 Drawing Sheet

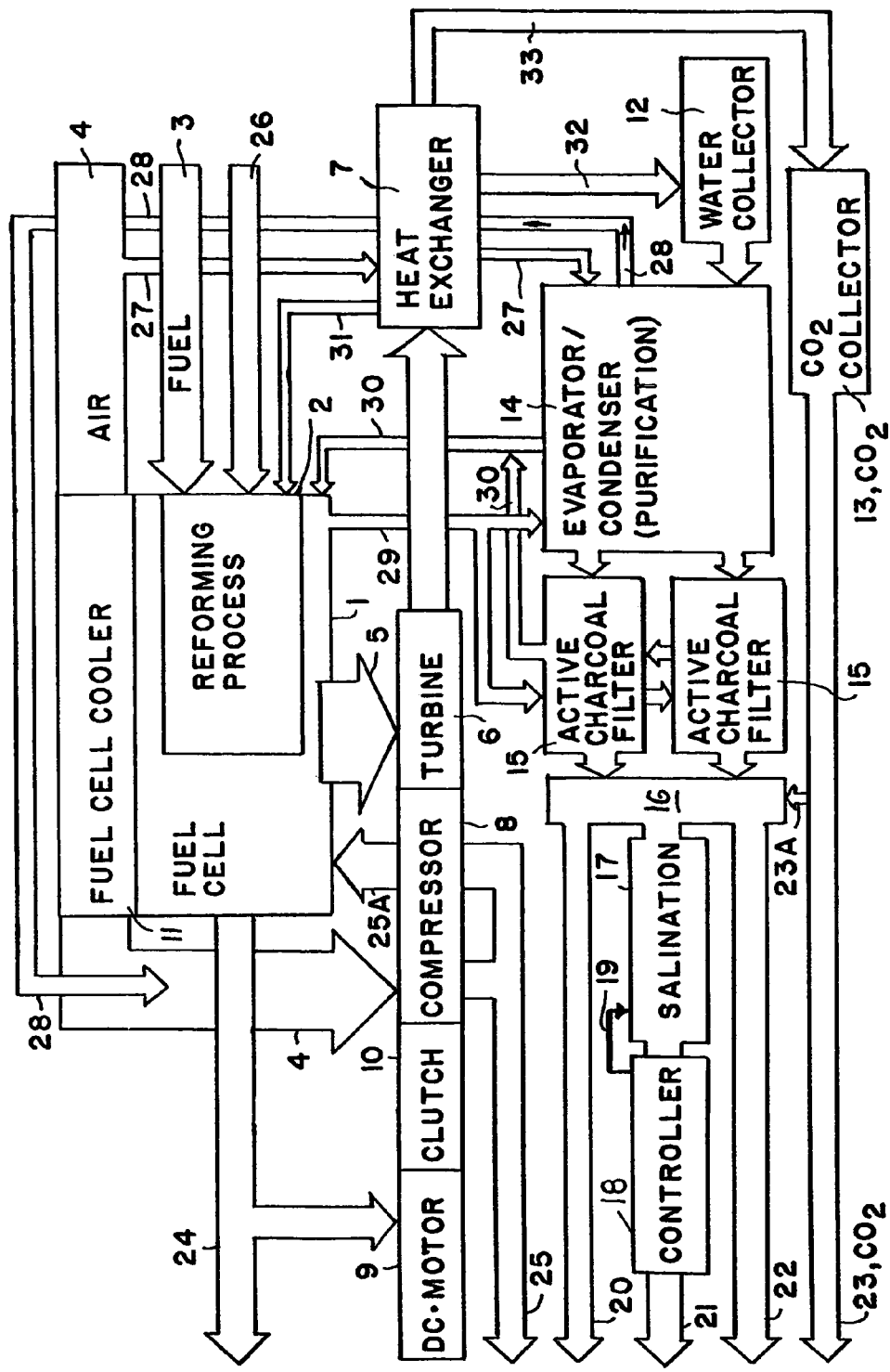

METHOD FOR TREATING AND DISTRIBUTING WATER GENERATED IN A SELF-CONTAINED WATER USING UNIT

PRIORITY CLAIM

This application is based on and claims the priority under 35 U.S.C. §119 of German Patent Application 102 16 709.5, filed on Apr. 16, 2002, the entire disclosure of which is incorporated herein by reference.

FIELD OF THE INVENTION

The invention relates to a method for treating and distribution of water that is generated onboard of a craft such as an aircraft, a land vehicle such as a train, a watercraft such as a passenger ship, as well as autonomous or self-contained stationary equipment.

BACKGROUND INFORMATION

It is possible to generate water by the use of fuel cells or other suitable processes. Water produced in such cells or processes must meet several regulations depending on the intended type of use, for example water intended for flushing toilets does not need to meet requirements for potable water or shower water. Wash water and air humidifying water in air conditioning systems must meet still other requirements. For example, potable water must be suitable for drinking by humans and must meet the regulation requirements of national and international potable water regulations. Shower water and wash water used in aircraft must also meet potable water qualities in accordance with national and/or international potable water regulations because shower and wash water may also enter the human body. Water for humidifying the air treated by an air conditioning system must be free of germs, free of fungi, and as free as possible of salts in order to avoid deposits in the air conditioning and air distribution system. Similarly, water that is intended for flushing toilets should also be free of germs and free of salts in order to avoid deposits in the equipment where such water is used.

OBJECTS OF THE INVENTION

It is the purpose of the invention to provide various water qualities outlined above and to meet certain other requirements for distributing water of different qualities at different locations in the treatment or generation process.

SUMMARY OF THE INVENTION

According to the invention the above object has been achieved by the combination of the following steps performed in a self-contained unit, such as a passenger aircraft,
  a) combining at least one high temperature fuel cell (1) with the operation of a power plant such as a turbine (6),
  b) integrating a reformer process (2) into said at least one high temperature fuel cell,
  c) operating the reformer process (2) by process heat from said at least one high temperature fuel cell (1) thereby using at least two fuel components one of which is a hydrocarbon fuel, and preheating at least one fuel component of said two fuel components by process heat of said at least one high temperature fuel cell,
  d) admixing at least one of contaminated water or gray water and fresh water to at least one of said two fuel components in said reformer process (2),
  e) operating a water purification process (14, 15) with process heat from said high temperature fuel cell (1), and
  f) feeding purified water from said water purification process (14, 15) to a water distribution system (16, 17, 18, 19, 20, 21, 22).

By combining a power plant such as a turbine with one or more high temperature fuel cells that operate in a temperature range above 500° C. and further integrating into the fuel cell a reformer process that is operated by the process heat of the fuel cell, water can be produced efficiently by using hydrocarbon fuels to which so-called gray water and/or fresh water has been admixed. The water purification is performed by using the process heat of the fuel cell or cells. Only a portion of the produced water that is intended for human consumption is passed through a salination process that is preferably self-controlled by testing the water quality producing a feedback control signal as a result of the testing and feeding the control signal back to control the quantity of salt to be added to the potable water.

The present method produces water in a multi-stage water generating and water treatment operation or process, including the steps of water production, water treatment, water distribution and water salination to the extent necessary for producing potable water qualities. An apparatus for performing the present method comprises essentially the following components. The water production and treatment is accomplished by using high temperature fuel cells which has the advantage that the produced water is absolutely free of germs. Such germ-free quality is guaranteed due to the high temperature of the fuel gases which do not contain any germs because germs do not survive these high temperatures. Accordingly the end product water is also free of germs. The high temperature fuel cell or cells operate at temperatures above 500° C. and are thus suitable for use in the present process.

The purification is accomplished in a purification station or unit including at least one evaporator and one condenser for removing undesired contaminations out of the generated water. The evaporation process, or rather the evaporate is passed through an active charcoal filter. The evaporation process is operated with the waste heat of the high temperature fuel cell. Preferably two active charcoal filters are provided which alternately are regenerated by using waste heat from the high temperature fuel cell.

The water distribution is accomplished in a pipe or conduit network which is connected to a collecting tank or buffer container which is provided with outlets for other distribution systems including a system for humidifying the air in the aircraft by supplying the required water to the air conditioning system. Another pipe line provides toilet flushing water while still another pipe line provides drinking water, shower water, and wash water that has bene salified in accordance with regulation requirements.

The drinking water, shower water, and wash water is passed through a salination apparatus in which salt, for example table salt, is supplied or rather mixed with the water to the extent necessary for human consumption. A salination control station is arranged downstream of the salination station. The water quality, especially the components dissolved in the water, is measured, for example by measuring the electrical conductivity of the water to produce a feedback control signal which assures that the salt quantity added in the salination process satisfies the government regulation requirements for potable water. Thus, the salination is automatically controlled by controlling the quantity of salt to be added to the water to make it potable.

BRIEF DESCRIPTION OF THE DRAWINGS

In order that the invention may be clearly understood, it will now be described in connection with an example embodiment, with reference to the accompanying drawing, in which the single FIGURE shows schematically a system according to the invention for the treatment and distribution of water, for example in an aircraft.

DETAILED DESCRIPTION OF A PREFERRED EXAMPLE EMBODIMENT AND OF THE BEST MODE OF THE INVENTION

The single FIGURE shows schematically a high temperature fuel cell 1 feeding its exhaust gas 5 to a turbine 6. According to the invention an internal reformer process 2 is integrated into the high temperature fuel cell 1 as shown in the drawing. Fuel 3, such as hydrocarbon fuels, gray water 26, and/or fresh water are supplied to the reformer process 2 which is integrated into the fuel cell 1. Additional heat 31 from a heat exchanger 7 is preferably also supplied to the internal reformer process 2. The heat exchanger 7 receives the water containing exhaust of the turbine 6 to produce water 32 and carbon dioxide ($CO_2$) 13. The water is collected in a tank 12. The $CO_2$ is collected in a container 13. Air 4 is preheated in a fuel cell cooler 11 and supplied to a compressor 8 coupled to the turbine 6. The compressor 8 is also drivable by a d.c. motor 9 coupled to the compressor 8 by a clutch 10. The d.c. motor 9 is driven by electric energy 24 produced by the high temperature fuel cell 1. The compressor 8 provides pressurized air 25 that may be collected in a pressurized container for starting the turbine 6. Additionally, the compressor 8 provides pressurized air to the high temperature fuel cell 1.

The water from the collecting tank 12 is fed into a purification process including an evaporator and condenser stage 14 as well as preferably two active charcoal filters 15. The evaporator condenser stage 14 receives waste heat 29 from the high temperature fuel cell 1 and supplies water or water vapor 30 to the fuel cell 1. The condensate from the evaporator condenser 14 is supplied to the charcoal filters 15 in parallel. However, the filters 15 are connected in series and receive waste heat 29 from the fuel cell 1. Fresh water portion 30 is also supplied to the fuel cell 1. The output of the filters 15 is supplied to a collecting or buffer tank 16 which receives a portion 23A of carbon dioxide branched off from the $CO_2$ supply 23. The tank 16 also feeds the collected water to an air conditioning system 20. This part of the water is desalinated and germ-free as well as free of fungi for air humidifying purposes.

A further output of the collecting tank 16 is connected to a salination process 17 that feeds its output through a control unit 18 which in turn supplies at its output drinking water 21. The control unit 18 tests the water quality coming from the salination process 17 to provide a feedback control signal 19 for the automatic control of the salination process. For example, the control unit 18 tests the electrical conductivity of the water to provide a respective feedback control signal 19 that controls the quantity of salt to be added to the water to make it potable, preferably in accordance with government regulations.

A further output of the tank 16 provides desalinated water 22, for example, for toilet flushing purposes.

As mentioned above, high temperature fuel cells suitable for the purposes of the invention operate at temperatures above 500° C. Solid oxide fuel cells (SOFC) and melting carbonate fuel cells (MCFC) are suitable for this purpose. Any other fuel cells having the characteristic of oxide ceramic fuel cells or melting carbonate fuel cells are also suitable for the present purposes.

The invention produces water by condensating water out of the exhaust gas of the high temperature fuel cell, whereby the exhaust gas 5 is first passed through at least one stage of the turbine 6 and then through the heat exchanger 7. However, the exhaust gas may pass not only through one, but through several turbine stages or it may pass through the stages of a plurality of separate turbines having any desired number of stages.

At least one fuel component of the two fuel components air 4 and e.g. kerosene 3 is supplied to the heat exchanger 7 as a coolant as shown at 27 in the drawing. The cooling air 27 is tapped off from the air supply 4 that passes through the high temperature fuel cell cooler 11 for supply to the compressor 8 and then into the high temperature fuel cell 1.

At least one of the two fuel components 3, 4 is preheated by the process heat of the high temperature fuel cell or cells 1. Similarly, fuel components that are supplied in liquid form such as kerosene 3 are vaporized prior to introduction into the inner reformer process 2 of the high temperature fuel cell 1, whereby process heat of the fuel cell 1 is used for the evaporation. Preferably, the preheating takes place in a fuel cell cooler 11, which preferably surrounds the fuel cell either partially or entirely.

Atomic or molecular hydrogen is produced according to the invention in the reformer process 2 integrated into the fuel cell 1 by using process heat of the high temperature fuel cell 1. The so produced atomic or molecular hydrogen is at least partly used for the production of energy and water in the high temperature fuel cell 1. The so produced atomic or molecular hydrogen may also be used at least partially as fuel for another fuel consumer in the system. Preferably, the atomic or molecular hydrogen is passed to the other fuel consumer through a molecular filter arranged upstream of such other fuel consumer. Molecular filters suitable for the present purposes are known as such. Another fuel consumer may for example be a proton exchange membrane fuel cell PEMFC.

Instead of admixing only gray or contaminated water to the fuel component that is fed into the internal reformer process 2, fresh water may be admixed that is taken either from an external fresh water source or from the evaporator condenser 14 and introduced into the reformer process 2 as shown at 30. Such portion of processed water may be tapped off from the evaporator condenser 14 and/or from the filter 15.

As shown in the drawing at least one stage of the turbine 6 is coupled to the compressor 8 for producing compressed air 4 that is fed at least partly at 25A into the high temperature fuel cell 1. Another portion 25 is used in a pneumatic system. Preferably, the compressor 8 is alternatively drivable by the d.c. motor 9 connected to the compressor 8 through a coupling 10, whereby the d.c. motor 9 is driven by electric energy 24 produced by the high temperature fuel cell 1. Preferably the clutch 10 is a controllable clutch.

As mentioned, and according to the invention carbon dioxide ($CO_2$) is separated in the heat exchanger 7 and collected in a separate container 13.

According to the invention the evaporation and condensing process 14 receives waste heat 29 from the high temperature fuel cell 1. Preferably some vapor and/or water is returned through conduit 30 into the fuel cell 1 from the evaporator condenser 14 and from the charcoal filters 15. The charcoal filters 15 are operated, or rather regenerated, by waste heat 29 from the fuel cell 1 as shown in the drawing. Waste heat 29 is also supplied to the evaporator condenser 14. Reference numbers 27, 28 show that at least one fuel component, such as air 4, is used as a coolant in the evaporator condenser 14, whereby the coolant is then returned into the airstream 4 flowing through a conduit 28 to the compressor 8 downstream of the fuel cell cooler 11.

As mentioned, the active charcoal filters 15, or rather the charcoal is regenerated by using waste heat 29 from the high temperature fuel cell 1. Moreover, the evaporation and condensing process 14 is performed at such temperatures and durations that resulting purified water is free of germs, fungi and salts. The so purified water from the filter 15 is collected in a buffer tank 16 for distribution.

The purified water distribution system shown in the drawing has, for example, three branches 20, 21 and 22. All three branches are connected to the collecting or buffer tank 16. More or fewer branches may be provided as required. A portion of the purified water is supplied through the branch line 20 to an air conditioning system for humidifying the air in an aircraft, for example. Another portion of purified water is supplied to a pipe system for flushing toilets as shown at 22. Still another portion is prepared as drinking and shower water in a pipeline system 21. A salination unit 17 and a salination control unit 18 are inserted between the tank 16 and the pipe lines 21. The salifying system 17, 18 is controlled by its control unit 18 through a feedback signal 19 which measures at least one water quality such as the electrical conductivity which provides a control signal that indicates how much salt needs to be added in the salination unit 17 so that the salifying operation is controlled automatically through the feedback signal 19. Preferably, the feedback signal 19 also includes a signal component or parameter that makes sure that the potable water discharged from the salifying process meets national and international government regulations for potable water.

According to the invention the high temperature fuel cell 1 is used as an auxiliary power unit (APU). In such an arrangement the exhaust 5 of the high temperature fuel cell 1 is useable in one or several gas turbines 8 and possibly also in a stirling engine or in other heat operated power plants. In this manner it is possible to produce directly compressed air which is either used for the pressurization and climate control in an aircraft body or cabin or for starting the power plant of the aircraft. Additionally, hydraulic pumps may be driven by the energy obtained from the APU. These hydraulic pumps provide an emergency pressurization of the hydraulic system of the aircraft. For this purpose it is necessary that an emergency fuel supply is provided for the high temperature fuel cell or cells. Such emergency fuel may, for instance be made available in bottles that contain, for example methane, whereby the regulation requirements regarding redundancy is achieved by using a respective number of high temperature fuel cell systems and fuel supply bottles.

The water treatment operations or processes for the gray and fresh water are performed by using the exhaust or waste heat of the high temperature fuel cell or cells. Another advantage of the present system or method according to the invention is seen in that the water present in so-called black water can also be used to a substantial extent, whereby additionally a weight reduction is achieved. The generated water volume is collected in a buffer tank 16 and can be taken from that tank in variable quantities for different purposes, for example, as mentioned above in the air conditioning system for humidifying the air, in showers, and in pipe lines with hot and cold water for washing purposes and shower purposes. The main advantage of the present method is seen in a clearly higher efficiency of the high temperature fuel cell in combination with a gas turbine process. Furthermore, the present system or method is neither adversely affected by carbon monoxide nor by the particular quality of the fuel used for the purposes of the invention.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for processing and distributing water in a self-contained unit, said apparatus comprising:
  at least one high temperature fuel cell (1), a turbine (6) connected to said at least one high temperature fuel cell (1) for receiving exhaust gas from said at least one high temperature fuel cell (1), a reformer (2) integrated in said at least one high temperature fuel cell (1), wherein said reformer is operable by process heat of said at least one high temperature fuel cell (1), said reformer (2) having an inlet for at least one hydrocarbon fuel and an inlet for admixing at least one of contaminated water and fresh water to said hydrocarbon fuel, said apparatus further comprising a cooler (11) positioned for preheating at least one of two fuel components including said hydrocarbon fuel by process heat of said at least one high temperature fuel cell, said apparatus further comprising a water purifying station (14, 15) connected to said at least one high temperature fuel cell (1) for operating a water purification with process heat from said high temperature fuel cell (1), and a water distribution system connected to said water purifying station.

2. A method for processing and distributing water in a self-contained unit, said method comprising the following steps:
  a) combining at least one high temperature fuel cell (1) with an operation of a turbine (6),
  b) integrating a reformer process (2) into said at least one high temperature fuel cell,
  c) operating said reformer process (2) inside said at least one high temperature fuel cell by process heat from said at least one high temperature fuel cell (1) thereby using at least one hydrocarbon first fuel component and a second fuel component, and preheating at least one fuel component of said first and second fuel components by process heat of said at least one high temperature fuel cell,
  d) admixing at least one of contaminated water or gray water and fresh water to said at least one hydrocarbon first fuel component in said reformer process (2),
  e) operating a water purification process (14, 15) with process heat from said high temperature fuel cell (1), and
  f) feeding purified water from said water purification process (14, 15) to a water distribution system (16, 17, 18, 19, 20, 21, 22).

3. The method of claim 2, further comprising salifying said purified water in at least one branch (17, 18, 19, 21) of said water distribution system.

4. The method of claim 2, further comprising selecting said high temperature fuel cell (1) from the group consisting of any fuel cell operating at temperatures above 500° C., a solid oxide fuel cell (SOFC) and a melting carbonate fuel cell (MCFC).

5. The method of claim 2, wherein said preheating of said at least one fuel component for said high temperature fuel cell (1) is performed in a fuel cell cooler (11) which surrounds said fuel cell at least partially.

6. The method of claim 2, further comprising producing atomic or molecular hydrogen in said reformer process (2) by using process heat of said high temperature fuel cell (1), and using said atomic or molecular hydrogen at least partly for the production of energy and water in the high temperature fuel cell (1).

7. The method of claim 2, further comprising providing fresh water from any one of an external fresh water source and a condensate source (28) of said high temperature fuel cell, and introducing said fresh water to said reformer process (2).

8. The method of claim 2, further comprising pressurizing any one fuel component of said first and second fuel components for said high temperature fuel cell.

9. The method of claim 2, further comprising producing carbon dioxide ($CO_2$) in a condensation process (6, 7) downstream of said high temperature fuel cell (1), and separately collecting said carbon dioxide ($CO_2$) in a separate container (13).

10. The method of claim 2, further comprising producing atomic or molecular hydrogen in said reformer process (2) by using process heat of said high temperature fuel cell, and using said atomic or molecular hydrogen at least partially as fuel for another fuel consumer.

11. The method of claim 10, further comprising passing said atomic or molecular hydrogen at least partially through a molecular filter upstream of said other fuel consumer.

12. The method of claim 2, further comprising coupling at least one stage of said turbine (6) with a compressor (8) for producing compressed air.

13. The method of claim 12, further comprising driving said compressor (8) additionally with a d.c. motor (9).

14. The method of claim 13, further comprising connecting said d.c. motor (9) through a controllable clutch (10) to said compressor for alternatively driving said compressor by said d.c. motor (9) and said at least one turbine stage.

15. The method of claim 2, further comprising condensing water out of exhaust gases (5) of said high temperature fuel cell (1).

16. The method of claim 15, further comprising performing said condensing step by passing said exhaust gases (5) from said high temperature fuel cell (1) through at least one stage of said turbine (6).

17. The method of claim 16, further comprising performing said condensing step by passing said exhaust gases (5) downstream of said at least one stage of said turbine (6) through a heat exchanger (7).

18. The method of claim 17, further comprising using as a coolant for said heat exchanger (7) at least one fuel component of said first and second fuel components used in said high temperature fuel cell.

19. The method of claim 2, further comprising purifying water in an evaporation and condensing process (14).

20. The method of claim 19, further comprising using waste heat (29, 30) from said high temperature fuel cell (1) for evaporation in said evaporation and condensing process (14).

21. The method of claim 19, further comprising using as a cooling medium (27, 28) at least one of said first and second fuel components (3, 4) of said high temperature fuel cell for condensation in said evaporation and condensing process (14).

22. The method of claim 19, further comprising passing at least one of water vapor and condensate water through at least one active charcoal filter (15).

23. The method of claim 22, further comprising regenerating active charcoal in said active charcoal filter (15) by using waste heat (29) from said high temperature fuel cell (1).

24. The method of claim 19, further comprising performing said evaporation and condensing process (14) at such temperatures and durations that resulting purified water is free of germs, fungi and salts.

25. The method of claim 24, further comprising collecting said purified water free of germs, fungi and salts in an intermediate or buffer tank (16).

26. The method of claim 2, further comprising distributing a portion of said purified water to an air conditioning system (20) for humidifying the air in said self-contained unit, another portion to a toilet flushing water supply system (22), and another portion to a drinking and shower water distribution system (21).

27. The method of claim 26, further comprising salifying purified water in said drinking and shower water distribution system (21).

28. The method of claim 27, further comprising ascertaining, following said salifying, at least one water quality characteristic of said purified water.

29. The method of claim 28, further comprising measuring an electrical conductivity of purified and salified water for ascertaining said at least one water quality characteristic in the form of a salinity content.

30. The method of claim 28, further comprising producing a feedback control signal based on said at least one water quality characteristic and feeding back said control signal for controlling said salifying.

31. The method of claim 30, further comprising automatically controlling with said feedback control signal a quantity of salt to be added to said purified water for maintaining a predetermined salt content in said purified water.

32. The method of claim 31, wherein said predetermined salt content is selected to satisfy national and international potable water regulations.

33. A method for processing and distributing water in a self-contained unit, said method comprising the following steps:
   a) combining at least one high temperature fuel cell (1) with an operation of a turbine (6),
   b) integrating a reformer process (2) into said at least one high temperature fuel cell,
   c) operating said reformer process (2) by process heat from said at least one high temperature fuel cell (1) thereby using at least one hydrocarbon fuel comprising liquid fuel components,
   d) admixing at least one of contaminated water or gray water and fresh water to said at least one hydrocarbon fuel in said reformer process (2),
   e) operating a water purification process (14, 15) with process heat from said high temperature fuel cell (1),
   f) feeding purified water from said water purification Process (14, 15) to a water distribution system (16, 17, 18, 19, 20, 21, 22), and
   g) evaporating said liquid fuel components by process heat of said high temperature fuel cell.

* * * * *